July 9, 1968 C. J. DE GRAVE, JR., ET AL 3,391,598
CUVETTE ASSEMBLY
Filed May 25, 1964 2 Sheets-Sheet 1
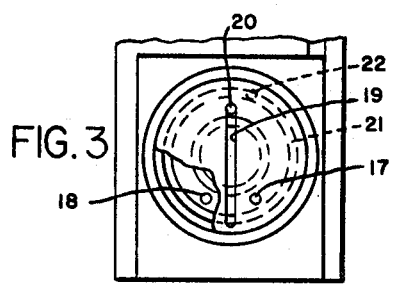
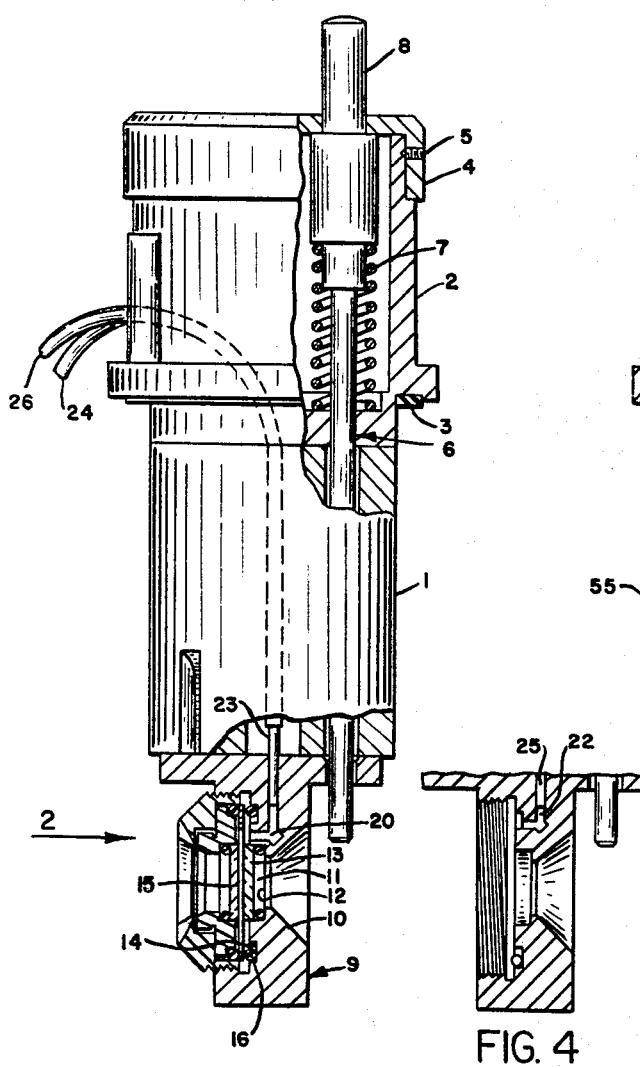
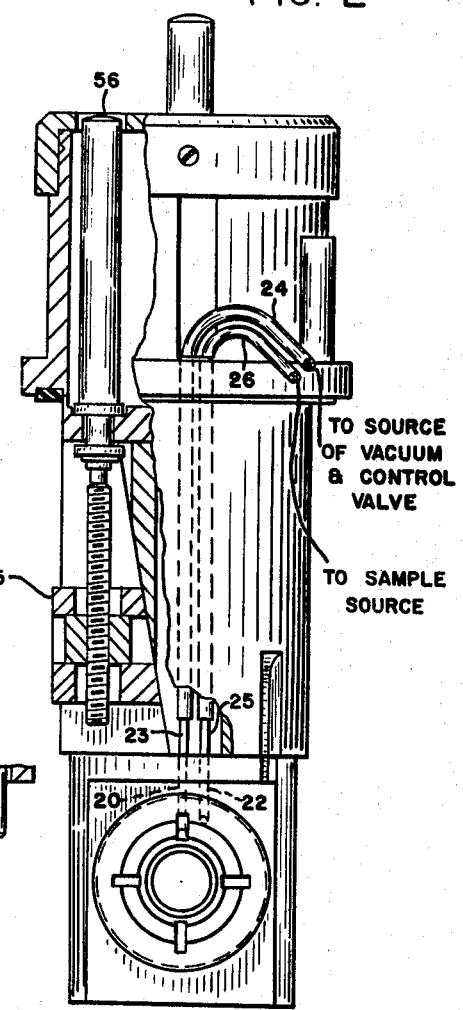
CHARLES J. DeGRAVE JR.
KENNETH A. SNOW
INVENTORS
BY
ATTORNEYS CHARLES J. DeGRAVE JR.
KENNETH A. SNOW
INVENTORS

ATTORNEYS

United States Patent Office 3,391,598
Patented July 9, 1968

3,391,598
CUVETTE ASSEMBLY
Charles J. De Grave, Jr., Chili, and Kenneth A. Snow, Greece, N.Y., assignors to Bausch & Lomb Incorporated, Rochester, N.Y., a corporation of New York
Filed May 25, 1964, Ser. No. 369,907
4 Claims. (Cl. 88—14)

ABSTRACT OF THE DISCLOSURE

A cuvette assembly is disclosed including a flow-through sample chamber. The sample chamber is defined by two-spaced windows and an elongated opening in a shim. The shim sealed between the windows in a position so that the length and the width of the opening extend along the windows. The thickness of the shim determines the length of the light path through the sample chamber. Single input and output passages are coupled to the shim opening having a cross-sectional dimension normal to sample fluid flow therethrough in the order of the width of the elongated opening or greater.

This invention relates to a spectrophotometer or colorimeter and more particularly to a cuvette assembly defining a sample chamber for use in spectrophotometry.

The analysis of a fluid sample in spectrophotometry requires a means of handling a fluid sample. It is desirable to use a minimum quantity of the fluid in the sample and also provide a convenient means of securing a sample and positioning the sample in the optical beam. Analysis of fluids which are translucent or have a high degree of opacity may require dilution of the sample which is burdensome and may give an inaccurate indication of the characteristics of the fluid sample if the length of light path in the sample is too great. Accordingly this invention overcomes these problems. The cuvette assembly is capable of limiting the length of the optical path to a capillary dimension and uses a small sample which is readily placed in the sample chamber and easily evacuated subsequent to viewing of the sample.

It is an object of this invention to provide a cuvette defining a sample chamber by means of windows spaced by an apertured mask for positioning a sample in an optical path.

It is another object of this invention to provide a cuvette assembly defining a sealed chamber having a short light path which is controlled by a replaceable shim means.

It is a further object of this invention to provide a sealed sample chamber defined by windows held in spaced relation by a mask of a predetermined thickness having an aperture forming the periphery of the sample chamber.

The objects of this invention are accomplished through the use of a number of assembled parts. Basically the sample chamber is defined by two windows held in spaced relation by a shim forming an aperture permitting the passage of light therethrough. The windows and the shim are held in position by a supporting structure and a screw arrangement which firmly seats and seals the windows to form a fluid tight sample chamber. An inlet passage is connected to a slot in the shim and an outlet passage is connected to the opposite end of the slot to permit evacuation of the sample. Refilling of the sample chamber is also accomplished by use of these passages.

The preferred embodiment of this invention will be described in the subsequent paragraphs and illustrated in the attached drawings.

FIG. 1 illustrates a side elevation view with fragmentary sections cut away to show the relative position of the parts.

FIG. 2 is a side elevation view taken at 90° to FIG. 1 as indicated by arrow 2 with fragmentary sections broken away to illustrate the device.

FIG. 3 illustrates a sub-assembly of the shim in position with the supporting structure.

FIG. 4 is a cross section view showing the inlet passage associated with the sub-assembly shown in FIG. 3.

Figure 5:
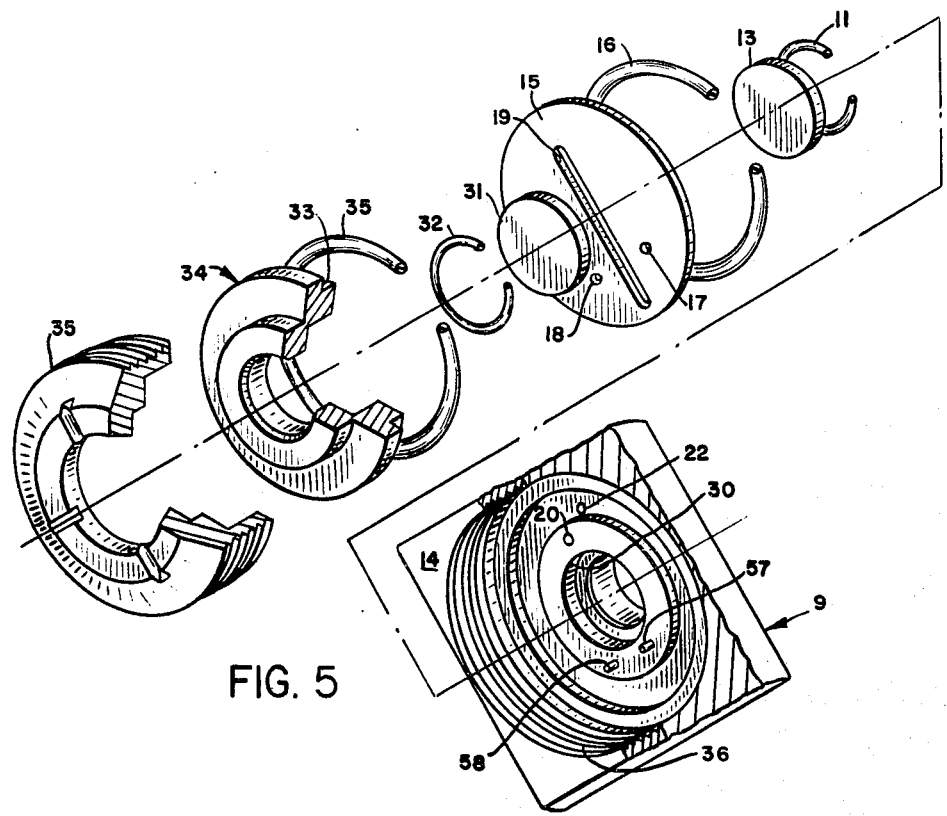
FIG. 5 is an exploded view of the cuvette assembly.

Referring to the drawings the cuvette assembly is illustrated in the assembled position as well as an exploded view showing each of the parts separately. Referring to FIG. 1 the block 1 supports the cylinder 2, and a rubber ring 3 to seal the unit when it is positioned in a spectrophotometer. A cap 4 is held in position on the cylinder 2 by the set screw 5. A shutter 6 is reciprocally mounted in the cylinder 2 and biased to an upward position to the spring 7. A handle 8 at the upper end of the shutter 6 provides a means for moving the shutter 6 downwardly to block passage of light through the cuvette assembly.

A base 9 is connected to the block 1 by a suitable means and supports the cuvette assembly. The cuvette assembly includes the base 9 which has an annular opening 10 extending centrally through the lower portion of the base. The annular opening 10 extends inwardly to receive an O-ring 11 which forms a fluid tight seal between a radial facing 12 on the base 9 and the lateral surface of the window 13. An annular recess 14 is formed concentrically with the opening 10 which receives the O-ring 16. A shim 15 is seated on the window 13, and an O-ring 16 which forms a seal on the outer periphery of the shim 15. The shim thickness controls the length of light path through the sample chamber. The shim thickness may be any dimension of less than .010 of a millimeter to greater than 10 millimeters. The shim 15 has two holes 17 and 18 axially parallel to the opening 10. A vertical slot 19 is formed in the shim which operates as an aperture in the optical system. The upper end of the slot 19 is in communication with an outlet passage 20. A fluid sample is passed out through the passage 20 from the slot 19. The annular recess 14 has an outer peripheral wall engaging the O-ring 16 to form a passage 21 in the radially inner portion of the annular recess 14. The passage 21 is connected to an inlet passage 22.

Referring to FIG. 3 the relative position of these passages is more clearly illustrated. FIG. 1 illustrates a cross section view running through the outlet passage 20 and shows its connection with the slot formed in the shim 15. A tube 23 forms a connection between the passage 20 and an outlet hose 24.

FIG. 4 illustrates a cross section view running through the inlet passage 22 and the tube 25 which is connected to the passage 22.

Referring to FIG. 2 the outlet hose 24 is connected to a source of vacuum and a control valve which controls a means for evacuating the sample chamber. The inlet hose 26 is connected to a sample source and the tube 25. The passage 21 extends downwardly and into the sample chamber which is formed by the slot 19 in shim 15. The inlet passage 22 is connected to the inlet tube 25 and the inlet hose 26. This is illustrated in FIG. 2. The sample source and the source of vacuum are not illustrated and it is assumed that suitable connections are made to provide a means for filling and evacuating the sample chamber. A valve is also provided in the means connected to the outlet hose 24 to control evacuation and refilling of the sample chamber at the desire of the operator.

Referring to FIG. 5 the base 9 is shown in a fragmentary cross section view with the pins 57 and 58 seated in the base. The inlet passage 22 and the outlet passage 20 provide a means for connecting the sample chamber to the external passages. The annular recess 30 receives the O-ring 11 and the window 13. The annular recess 14 receives the O-ring 16. The shim 15 is positioned for engagement with the window 13 and the O-ring 16. The slot 19 in shim 15 forms an aperture for transmission of light. The shim operates as a mask and in combination with the aperture permits light passage only through the narrow slot.

The window 31 engages the opposing surface of the shim 15 and forms a sealed chamber with the O-ring 32. The radial flange 33 on the outer periphery of the washer 34 receives the O-ring 35 which forms a seal with the shim 15. The washer is concentrically seated in the base 9. A nut 35 is threaded on its outer periphery and is threadedly received within the threaded portion 36 of the base 9. The components of the cuvette assembly as illustrated in the exploded view are assembled to form a cuvette defining a sample chamber.

Figure 6:
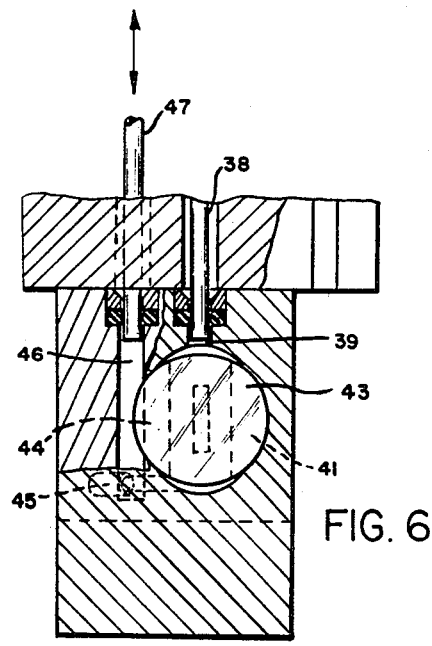
FIG. 6 is a modification of the cuvette assembly.
Figure 7:
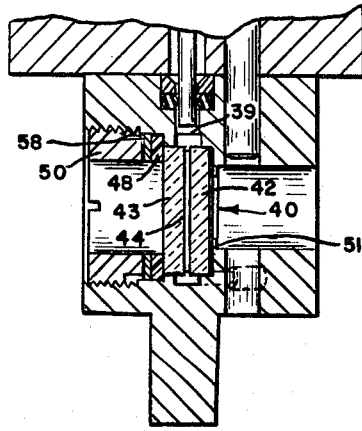
FIG. 7 is a cross section view taken at 90° to FIG. 6.

Referring to FIG. 6 a modification is illustrated. An inlet tube 38 extends into the passage 39 on the top of the cuvette assembly 40. The window 42 is seated on seal 51. Two shims 41 and 44 are positioned between the windows 42 and 43. The shims 41 and 44 are bonded to the window 42 and provide a passage downwardly through the space between the windows 42 and 43. The lower portion of the passage intermediate the windows 42 and 43 is connected to a lateral passage 45 which extends to the lowermost portion of the opening 46. The opening 46 receives the outlet tube 47 which may be reciprocated by suitable means from the normal "up" position as shown to a "down" position in which the fluid in the passage 45 and the cuvette sample chamber may be evacuated. The windows are held in position by the washer 58, seal 48 and nut 50. The cuvette assembly will be described in subsequent paragraphs.

Referring to FIG. 2 the inlet hose 26 is connected to a sample source and the outlet hose 24 is connected to a source of vacuum through a suitable valve control. When it is desired to evacuate the sample chamber the valve is operated creating a vacuum in the outlet hose 24 causing the sample to be evacuated.

The outlet hose 24 is connected to the tube 23 and passage 20. The passage 20 is in communication with the upper end of the slot 19 formed in the shim 15. The lower end of the slot 19 is in communication with the passage 21 of annular recess 14 which is radially inward of the O-ring 16 which is expanded against the outer periphery of the recess 14. The annular recess 14 is connected to the passage 22 as indicated in FIG. 4. The passage 22 is connected to the inlet hose 26 by the tube 25.

The cuvette assembly includes the supporting structure which provides a means for supporting the base 9. The supporting structure supports a shutter 6 which may be depressed to occlude light from passing through the system. The base 9 supports the O-ring 11 and window 13 which form a seal to the atmosphere. The shim 15 engages the O-ring 16 and creates an annular inlet passage in the recess 14 separate from the outlet passage 20. The vertical slot 19 forms an aperture in the optical system when the cuvette is mounted in position and also defines the sides of the sample chamber. The O-ring 35 and the O-ring 32 form a seal with the washer 34 when the nut 35 is screwed in position in the base 9. It can be seen that the shim 15 forms a dual function in operating as a spacer to control the light path length through the sample chamber and also forms an aperture in the optical system. The slot defines the dimensions of the sample chamber. Passage means into and out of the sample chamber is connected to a suitable valve to control the vacuum which is used to fill and evacuate the sample chamber.

The assembly is adapted for reception in a spectrophotometer and is maintained in position by the wedge 55. The wedge 55 is connected to a screw 56 which may be adjusted to provide a frictional force of the outer periphery of the well in a spectrophotometer which receives the cuvette assembly.

The preferred embodiment of this invention is shown and it is understood that modifications might be devised which would fall within the scope of this invention which is defined by the attached claims.

We claim:

1. A cuvette assembly comprising a supporting base, a window received in said supporting base, a second window aligned with said first window, a shim formed with an elongated uniform width aperture extending therethrough positioned intermediate said windows with the aperture length and width extending along the windows and the thickness of the shim controlling the length of the light path through said chamber, means fastening the assembly of parts to thereby define a sealed sample chamber within said aperture and intermediate said windows in said cuvette assembly, and inlet and outlet passages coupled respectively to opposite ends of said elongated aperture in said shim defining a single flow path for sample fluid through said sample chamber, said inlet and outlet passages having an internal cross-sectional dimension normal to the direction of sample fluid flow at least that of the width of said aperture in said shim.

2. A cuvette assembly comprising a supporting means having a central opening therein, a window received in said central opening, a second window aligned with said first window, a shim spaced intermediate said windows controlling the optical dimension intermediate said windows and formed with an elongated uniform width aperture extending therethrough, means for sealing said shim intermediate said windows, with the width and length of said shim extending along said windows, means for retaining the relative position of the parts in said cuvette assembly thereby providing a sample chamber of a predetermined optical dimension and a predetermined aperture opening, and inlet and outlet passages coupled respectively to opposite ends of said elongated aperture in said shim defining a single flow path for sample fluid through said chamber, said inlet and outlet means having a cross-sectional dimension normal to the direction of sample fluid flow therethrough at least that of the width of said aperture in said shim.

3. A cuvette assembly comprising a supporting means having a central opening, a window located within said opening, a shim engaging and aligned with said window, a second window engaging the opposing side of said shim, means defining an elongated uniform width aperture extending therethrough said shim located within said central opening forming a sample chamber with its length and width extending along said windows, means providing a seal for said cuvette, means for fastening said parts of said cuvette, an inlet passage connected to one end of said aperture in said shim and adapted for connection to a source of sample fluid and an outlet passage connected to the opposite end of said aperture in said shim having valve means coupled to said outlet passage and adapted for connection to a source of vacuum and to thereby provide a means for filling and evacuating said sample chamber, said inlet and outlet passages having a cross-sectional dimension normal to the direction of sample fluid flow at least that of the width of said aperture in said shim.

4. A cuvette assembly comprising, a supporting means having an opening, a window located in said opening, a second window spaced relative to said first window located in said opening, spacer means defining an elongated uniform width aperture extending therethrough controlling the spaced relationship of said windows relative to each other, sealing means sealing a sample chamber defined by the inner periphery of said aperture and the lateral surfaces of said windows with the length and width of said aperture extending along said windows, inlet and outlet passages connected respectively at opposite ends of said elongated aperture to said sample chamber and having valve means adapted for connection to a source of vacuum and a sample fluid source, thereby providing a means for filling and evacuating said sample chamber, and said inlet and outlet passages having a cross-sectional dimension normal to the direction of sample fluid flow at least that of the width of said aperture in said shim.

References Cited

UNITED STATES PATENTS 2,819,402   1/1958   Watson et al.
3,090,861   5/1963   Haenni.

OTHER REFERENCES

Rose, George: "A Separable and Multipurpose Tissue Culture Chamber," Texas Report of Biology and Medicine, U. 12, No. 4, 1954, pp. 1074–1083.

JEWELL H. PEDERSEN, *Primary Examiner.*

W. A. SKLAR, *Assistant Examiner.*